United States Patent
Nam et al.

(10) Patent No.: US 11,289,753 B2
(45) Date of Patent: Mar. 29, 2022

(54) APPARATUS AND METHOD FOR BATTERY TEMPERATURE CONTROL

(71) Applicant: LG CHEM, LTD., Seoul (KR)

(72) Inventors: Jin-Moo Nam, Daejeon (KR); Yo-Han Ko, Daejeon (KR); Yong-Seok Choi, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 82 days.

(21) Appl. No.: 16/619,816

(22) PCT Filed: Jan. 2, 2019

(86) PCT No.: PCT/KR2019/000050
§ 371 (c)(1),
(2) Date: Dec. 5, 2019

(87) PCT Pub. No.: WO2019/156352
PCT Pub. Date: Aug. 15, 2019

(65) Prior Publication Data
US 2020/0136211 A1  Apr. 30, 2020

(30) Foreign Application Priority Data
Feb. 7, 2018 (KR) .................. 10-2018-0015141

(51) Int. Cl.
*H01M 10/00* (2006.01)
*H01M 10/6554* (2014.01)
(Continued)

(52) U.S. Cl.
CPC ..... *H01M 10/6554* (2015.04); *H01M 10/613* (2015.04); *H01M 10/63* (2015.04); *H01M 10/6569* (2015.04)

(58) Field of Classification Search
CPC ......... H01M 10/6554; H01M 10/6555; H01M 10/6556; H01M 10/651; H01M 10/613;
(Continued)

(56) References Cited

U.S. PATENT DOCUMENTS

2009/0075162 A1  3/2009  Takahashi
2010/0062321 A1  3/2010  Nakamura
(Continued)

FOREIGN PATENT DOCUMENTS

JP   9-199882 A    7/1997
JP   2003-163482 A  6/2003
(Continued)

OTHER PUBLICATIONS

International Search Report (PCT/ISA/210) issued in PCT/KR2019/000050, dated Apr. 23, 2019.
Extended European Search Report for European Application No. 19751325.2, dated Dec. 3, 2020.

*Primary Examiner* — Raymond Alejandro
(74) *Attorney, Agent, or Firm* — Birch, Stewart, Kolasch & Birch, LLP

(57) ABSTRACT

An apparatus and method for battery temperature control, the apparatus including a cooling plate, a first transporter selectively moving the cooling plate along a first axis, and a controller operably coupled to the first transporter and selectively outputting a control signal to the first transporter for commanding the first transporter to move the cooling plate to a first location or a second location. The cooling plate comes into contact with an outer surface of the battery by a preset maximum area at the first location, and the cooling plate comes into contact with the outer surface by an area smaller than the maximum area or is separated from the outer surface at the second location.

12 Claims, 11 Drawing Sheets

(51) Int. Cl.
*H01M 10/613* (2014.01)
*H01M 10/63* (2014.01)
*H01M 10/6569* (2014.01)

(58) Field of Classification Search
CPC . H01M 10/617; H01M 10/63; H01M 10/6569
See application file for complete search history.

(56) References Cited

U.S. PATENT DOCUMENTS

| | | |
|---|---|---|
| 2011/0189511 A1 | 8/2011 | Yoon |
| 2012/0298433 A1 | 11/2012 | Ohkura |
| 2015/0338174 A1 | 11/2015 | Murata et al. |
| 2018/0205124 A1 | 7/2018 | Lee et al. |

FOREIGN PATENT DOCUMENTS

| | | | | |
|---|---|---|---|---|
| JP | 2008-037357 | * | 2/2008 | ............. B60R 16/04 |
| JP | 2008-037357 A | | 2/2008 | |
| JP | 2008-135191 A | | 6/2008 | |
| JP | 2008-204762 A | | 9/2008 | |
| JP | 2008-258199 A | | 10/2008 | |
| JP | 2012-248299 A | | 12/2012 | |
| JP | 2012-248363 A | | 12/2012 | |
| JP | 2013-37919 A | | 2/2013 | |
| JP | 2017-503330 A | | 1/2017 | |
| KR | 10-2008-0005030 A | | 1/2008 | |
| KR | 10-2010-0054684 A | | 5/2010 | |
| KR | 10-2011-0090236 A | | 8/2011 | |
| KR | 10-2017-0107792 A | | 9/2017 | |
| WO | WO 2014/156991 A1 | | 10/2014 | |

* cited by examiner

APPARATUS AND METHOD FOR BATTERY TEMPERATURE CONTROL

TECHNICAL FIELD

The present disclosure relates to an apparatus and method for battery temperature control.

The present application claims priority to Korean Patent Application No. 10-2018-0015141 filed in the Republic of Korea on Feb. 7, 2018, the disclosure of which is incorporated herein by reference.

BACKGROUND ART

Recently, there is dramatically growing demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages of free charging and discharging, a very low self-discharge rate and high energy density.

A battery generally includes at least one battery cell and a case. In particular, a high voltage battery mounted in an electric vehicle generates a large amount of heat during charging/discharging, and a structure for effectively cooling the battery is of a great interest.

A battery module disclosed by Patent Literature 1 which is one of earlier technologies includes a case and a heat sink. In detail, when a plurality of batteries is received in the case, the heat sink is in direct contact with the lower surface of the case. Heat from the plurality of batteries is discharged through the case and the heat sink, and the batteries are cooled.

However, according to the conventional art such as Patent Literature 1, a heat transfer structure such as the heat sink always contacts the case over a predetermined area, and rather, in some cases, efficient battery use may not be achieved. For example, when the battery is in an optimum temperature range, the charging/discharging efficiency of the battery increases, but due to the heat sink, it may take a long time to increase the temperature of the battery to the optimum temperature range. In another example, when the temperature of the heat sink is too much high, heat is transferred from the heat sink to the battery, and the battery may be overheated.

(Patent Literature 1) Korean Patent Publication No. 10-2017-0107792 (published Sep. 26, 2017)

DISCLOSURE

Technical Problem

The present disclosure is designed to solve the above-described problem, and therefore the present disclosure is directed to providing an apparatus and method for effectively controlling the temperature of a battery by selectively bringing a heat transfer structure into contact with part of the battery according to an environment in which the battery is used.

These and other objects and advantages of the present disclosure will be understood by the following description and will be apparent from the embodiments of the present disclosure. Further, it will be readily understood that the objects and advantages of the present disclosure can be realized by the means set forth in the appended claims and combinations thereof.

Technical Solution

Various embodiments of the present disclosure for achieving the above-described object are as follows.

An apparatus for battery temperature control according to an embodiment of the present disclosure includes a cooling plate configured to come into contact with an outer surface of a battery, a first transporter configured to selectively move the cooling plate along a first axis to bring the cooling plate into contact with the outer surface of the battery or separate the cooling plate from the outer surface of the battery, and a controller operably coupled to the first transporter. The controller selects any one of a first operation mode and a second operation mode based on a first temperature value indicating a temperature of the battery. The controller outputs a first control signal to the first transporter for commanding the first transporter to move the cooling plate to a first location when the first operation mode is selected. The controller outputs a second control signal to the first transporter for commanding the first transporter to move the cooling plate to a second location when the second operation mode is selected. The cooling plate comes into contact with the outer surface by a preset maximum area when the cooling plate is moved to the first location. The cooling plate comes into contact with the outer surface by an area smaller than the maximum area or is separated from the outer surface when the cooling plate is moved to the second location.

The cooling plate may include a phase change material.

The outer surface of the battery may include a plurality of first protrusions protruding toward the cooling plate. The cooling plate may include a plurality of second protrusions protruding toward the outer surface. The plurality of second protrusions may be disposed between the plurality of first protrusions and come into contact with the plurality of first protrusions when the cooling plate is moved to the first location.

The controller may select the first operation mode when the first temperature value is equal to or larger than a first threshold.

The controller may select any one of the first operation mode and the second operation mode further based on a second temperature value indicating a temperature of the cooling plate.

The controller may select the first operation mode when the first temperature value is larger than the second temperature value and a difference between the first temperature value and the second temperature value is equal to or larger than a second threshold.

The controller may select the second operation mode (i) when the first temperature value is equal to or less than the second temperature value, or (ii) when the first temperature value is larger than the second temperature value and a difference between the first temperature value and the second temperature value is less than the second threshold.

The controller may calculate a transport distance based on the first temperature value and the second temperature value when the second operation mode is selected. The transport distance may indicate a distance between the first location and the second location.

The transport distance may be proportional to a difference between the first temperature value and the second temperature value.

The apparatus for battery temperature control may further include a second transporter configured to selectively move the cooling plate along a second axis that is different from the first axis.

A battery system according to another embodiment of the present disclosure includes the apparatus for temperature control.

A method for battery temperature control according to still another embodiment of the present disclosure uses an apparatus for temperature control including a cooling plate, a first transporter and a controller. The method includes determining, by the controller, a first temperature value indicating a temperature of a battery, selecting, by the controller, any one of a first operation mode and a second operation mode based on the first temperature value, outputting, by the controller, a first control signal to the first transporter for commanding the first transporter to move the cooling plate to a first location along a first axis when the first operation mode is selected, and outputting, by the controller, a second control signal to the first transporter for commanding the first transporter to move the cooling plate to a second location along the first axis when the second operation mode is selected. The cooling plate comes into contact with an outer surface of the battery by a preset maximum area when the cooling plate is moved to the first location. The cooling plate comes into contact with the outer surface by an area smaller than the maximum area or is separated from the outer surface when the cooling plate is moved to the second location.

Advantageous Effects

According to at least one of the embodiments of the present disclosure, it is possible to effectively control the temperature of the battery by selectively bringing the heat transfer structure into contact with the battery according to an environment in which the battery is used.

The effects of the present disclosure are not limited to the above-mentioned effects, and other effects not mentioned herein will be clearly understood by those skilled in the art from the appended claims.

BRIEF DESCRIPTION OF DRAWINGS

The accompanying drawings illustrate a preferred embodiment of the present disclosure, and together with the following detailed description of the present disclosure, serve to provide a further understanding of the technical aspects of the present disclosure, and thus the present disclosure should not be construed as limited to the drawings.

MODE FOR DISCLOSURE

Figure 1:
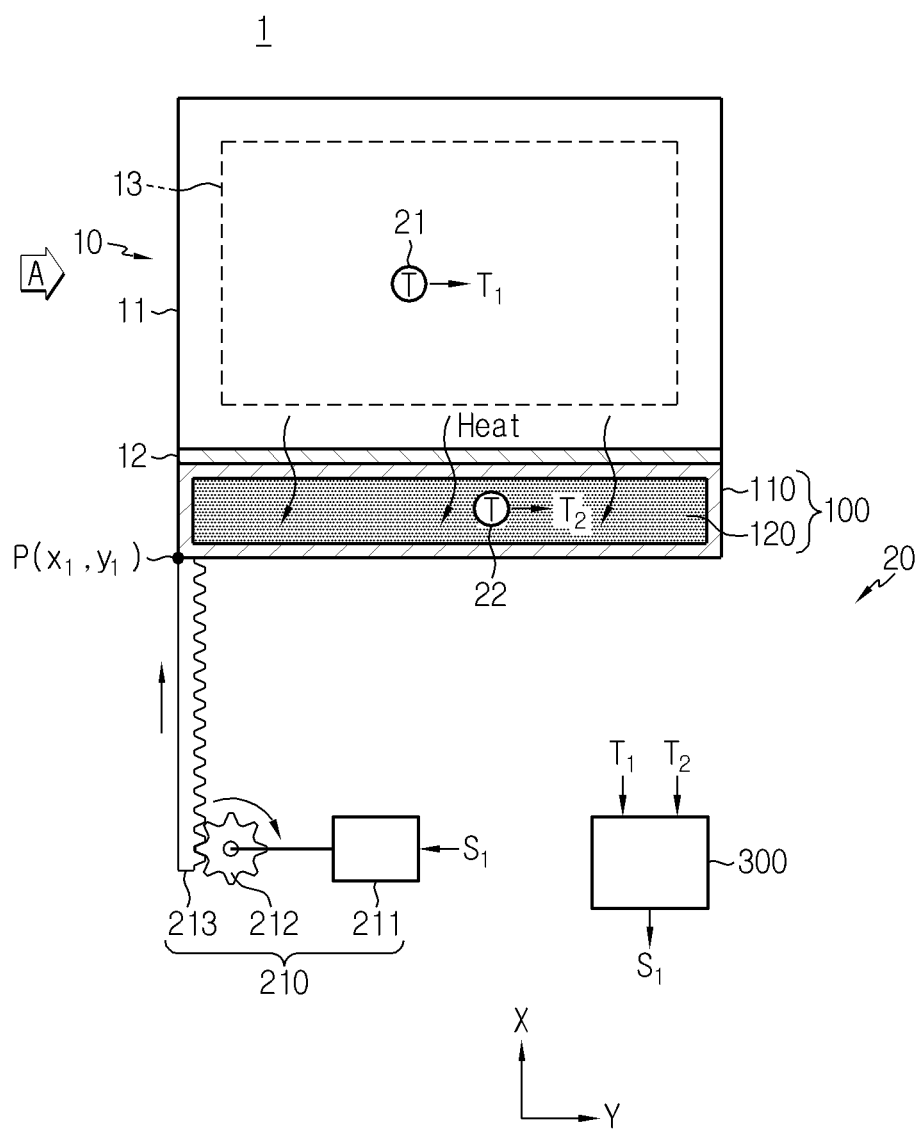
FIGS. 1 and 2 are diagrams for reference in describing a battery system according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and variations could be made thereto at the time of filing the application.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term <control unit> as used herein refers to a processing unit of at least one function or operation, and this may be implemented in hardware or software alone or in combination.

In addition, throughout the specification, it will be further understood that when an element is referred to as being "connected to" another element, it can be directly connected to the other element or intervening elements may be present.

Figure 2:
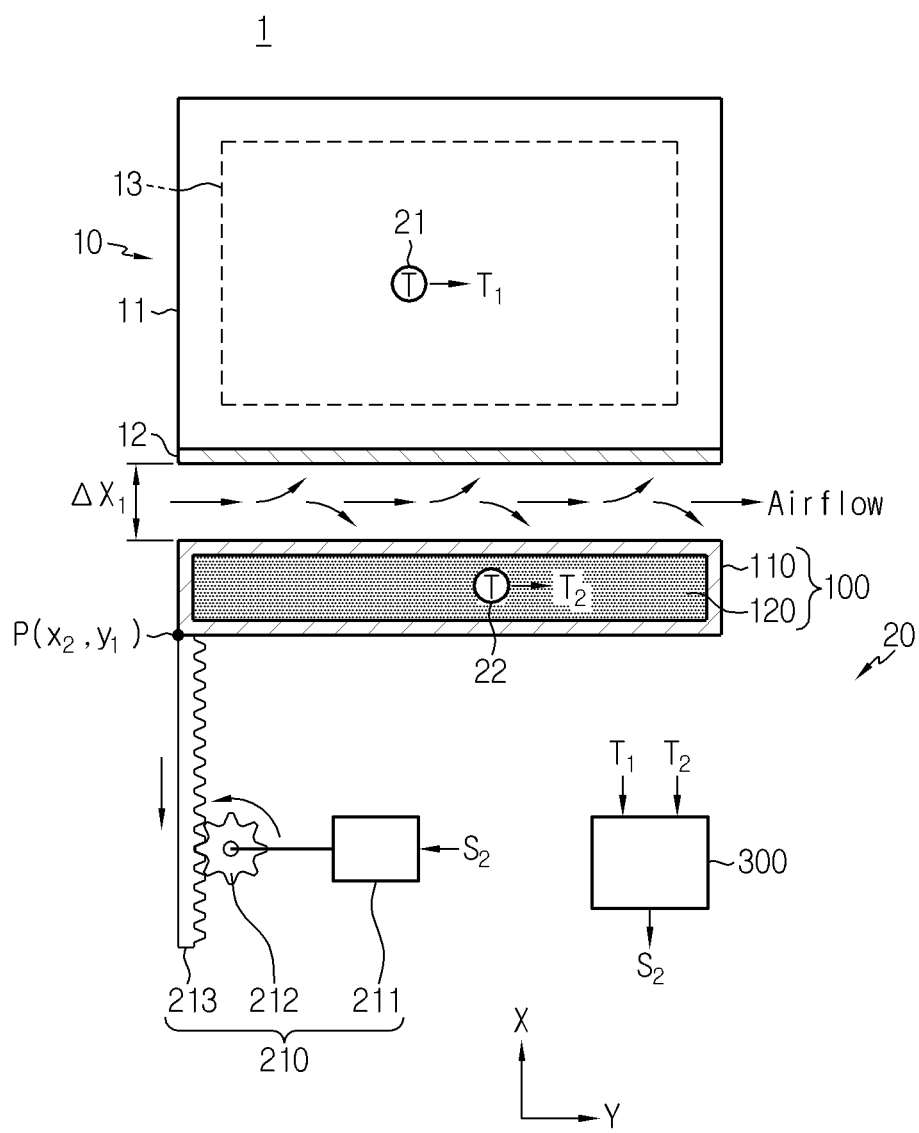

FIGS. 1 and 2 are diagrams for reference in describing a battery system according to an embodiment of the present disclosure.

Referring to FIGS. 1 and 2, the battery system 1 includes a battery 10 and a temperature control apparatus 20. The battery 10 includes a case 11 and at least one rechargeable cell 13. The at least one rechargeable cell 13 is at least partially sealed by the case 11.

The temperature control apparatus 20 is configured to control the temperature of the battery 10 by selectively cooling the battery 10. The battery 10 may be fixed to the body of an electric vehicle, for example, by bolting.

The temperature control apparatus 20 includes a cooling plate 100, a transport unit 210 and a control unit 300. Optionally, the temperature control apparatus 20 may further include at least one of a first temperature sensor 21 and a second temperature sensor 22.

The cooling plate 100 is disposed such that the cooling plate 100 can contact the case 11 of the battery 10. An outer surface 12 refers to part of the case 11 disposed such that the part can contact the cooling plate 100. The cooling plate 100 may include a case 110 and a heat transfer material 120. The heat transfer material 120 is filled in the case 110, and may be a material having a predetermined level of thermal conductivity or higher to absorb heat from the outer surface 12, for example, a phase change material (PCM).

The transport unit 210 is mechanically coupled to the cooling plate 100, and is configured to selectively move the cooling plate 100 in a direction or a reverse direction along the x-axis in response to a command from the control unit 300. For example, the x-axis may be an axis perpendicular to the ground.

The transport unit 210 may include a first actuator 211, a first gear 212 and a second gear 213. The first actuator 211 may be, for example, a step motor, and is configured to rotate the first gear 212 in the clockwise or counterclockwise direction. The first gear 212 is disposed such that the first gear 212 is engaged with the second gear 213. The second gear 213 is configured to convert a rotational motion of the first gear 212 to a linear motion on the x-axis. For example, the first gear 212 may be a pinion gear, and the second gear 213 may be a rack gear. As shown, one side of the second gear 213 is coupled to the cooling plate 100, and the distance between the cooling plate 100 and the outer surface 12 may change as much as a distance corresponding to an amount of rotation of the first gear 212 within a predetermined first range along the x-axis. The transport unit 210 may only move the cooling plate 100 along the x-axis. Accordingly, the movement of the cooling plate 100 along the y-axis is restricted. For example, the y-axis may be an axis parallel to the ground.

The control unit 300 may be physically implemented using at least one of application specific integrated circuits (ASICs), digital signal processors (DSPs), digital signal processing devices (DSPDs), programmable logic devices (PLDs), field programmable gate arrays (FPGAs), microprocessors and electrical units for performing other functions. A memory may be embedded in the control unit 300. The memory may store programs and data for performing a method as described below. For example, the memory may include at least one type of storage medium of flash memory type, hard disk type, Solid State Disk (SSD) type, Silicon Disk Drive (SDD) type, multimedia card micro type, random access memory (RAM), static random access memory (SRAM), read-only memory (ROM), electrically erasable programmable read-only memory (EEPROM) and programmable read-only memory (PROM).

The control unit 300 is operably coupled to the transport unit 210. Optionally, the control unit 300 may be operably coupled to at least one of the first temperature sensor 21 and the second temperature sensor 22. The first temperature sensor 21 is inside or outside of the case 11 of the battery 10, and transmits a first temperature signal $T_1$ indicating the temperature of the battery 10 to the control unit 300. The second temperature sensor 22 may be inside or outside of the cooling plate 100, and transmit a second temperature signal $T_2$ indicating the temperature of the cooling plate 100 to the control unit 300. The control unit 300 may determine a first temperature value based on the first temperature signal $T_1$. The control unit 300 may determine a second temperature value based on the second temperature signal $T_2$.

The control unit 300 may select any one of a first operation mode and a second operation mode based on at least one of the first temperature value and the second temperature value at a predetermined time interval or each time a preset condition is satisfied. The first operation mode may be a mode for bringing the cooling plate 100 into contact with the outer surface 12, and the second operation mode may be a mode for separating the cooling plate 100 from the outer surface 12.

When the first operation mode is selected, the control unit 300 outputs a control signal $S_1$ to the transport unit 210 for commanding the transport unit 210 to move the cooling plate 100 to a first location along the x-axis. When the cooling plate 100 is moved to the first location, the x-y coordinates of a predetermined point P of the cooling plate 100 may be $(x_1, y_1)$. As shown in FIG. 1, when the cooling plate 100 is moved to the first location, the cooling plate 100 comes into contact with the outer surface 12 by a preset maximum area. Accordingly, heat can be transferred from the battery 10 to the cooling plate 100 through the contact part between the cooling plate 100 and the outer surface 12.

When the second operation mode is selected, the control unit 300 outputs a control signal $S_2$ to the transport unit 210 for commanding the transport unit 210 to move the cooling plate 100 to a second location along the x-axis. When the cooling plate 100 is moved to the second location, the coordinates of the predetermined point P of the cooling plate 100 may be $(x_2, y_1)$. As shown in FIG. 2, when the cooling plate 100 is moved to the second location, the cooling plate 100 is in non-contact with (i.e., separated from) the outer surface 12. That is, the cooling plate 100 is separated from the outer surface 12 at the second location. Accordingly, direct heat transfer between the cooling plate 100 and the outer surface 12 is impeded. In this instance, a flow channel through which air flows may be formed through a space between the cooling plate 100 and the outer surface 12.

The control unit 300 may determine the second location at the same time as the second operation mode is selected or after the second operation mode is selected. In detail, the first location is a preset fixed location at which the cooling plate 100 comes into contact with the outer surface 12, while the second location is a location that may change depending on at least one of the first temperature value and the second temperature value. The control unit 300 may calculate a first transport distance $\Delta X_1$ based on at least one of the first temperature value and the second temperature value. For example, when the first temperature value is greater than the second temperature value, the first transport distance $\Delta X_1$ may be proportional to a difference between the first temperature value and the second temperature value or a difference between the first temperature value and a preset first threshold within a predetermined first range.

In this instance, $\Delta X_1$ is equal to $x_2-x_1$ or $x_1-x_2$. That is, the first transport distance refers to a distance between the first location and the second location. The control unit 300 may determine, as the second location, a location that is apart from the first location by the first transport distance along the x-axis. That is, the control signal $S_2$ may be a signal for commanding to move the cooling plate 100 so that the cooling plate 100 is spaced apart from the outer surface 12 by the first transport distance along the x-axis from the first location.

Figure 3:
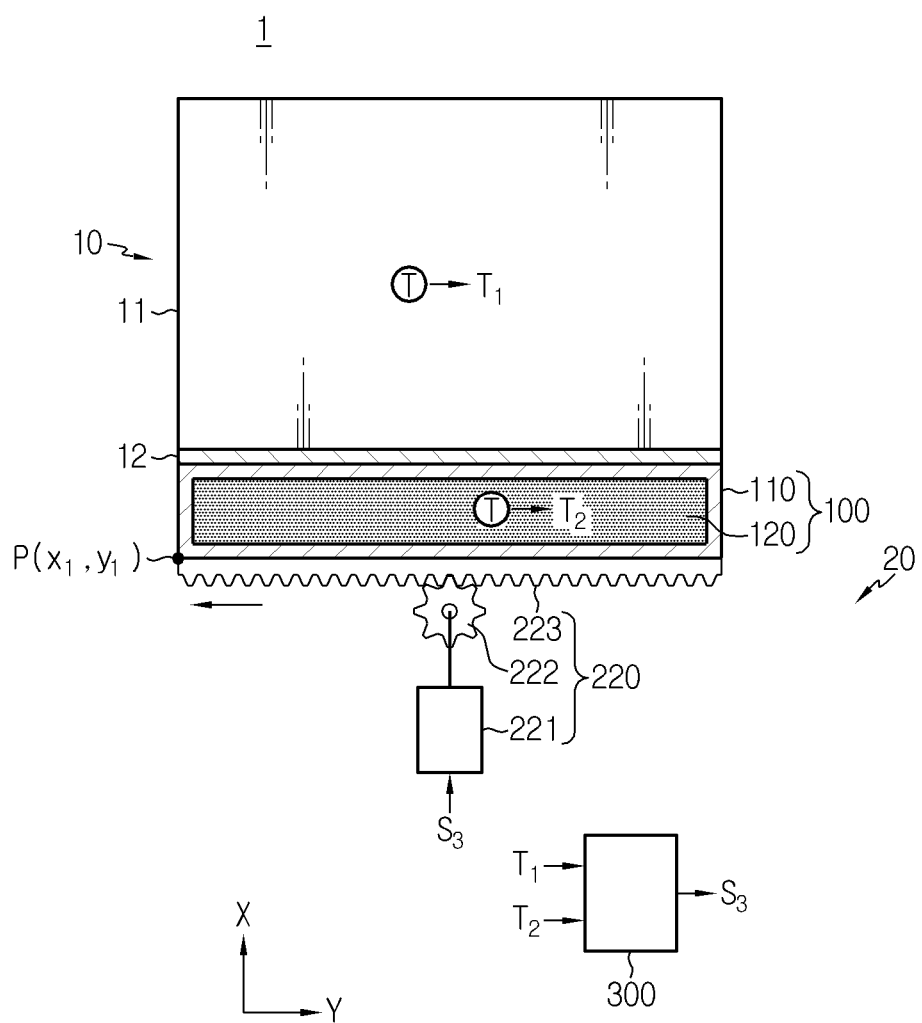
FIGS. 3 and 4 are diagrams for reference in describing a battery system according to another embodiment of the present disclosure.
Figure 4:
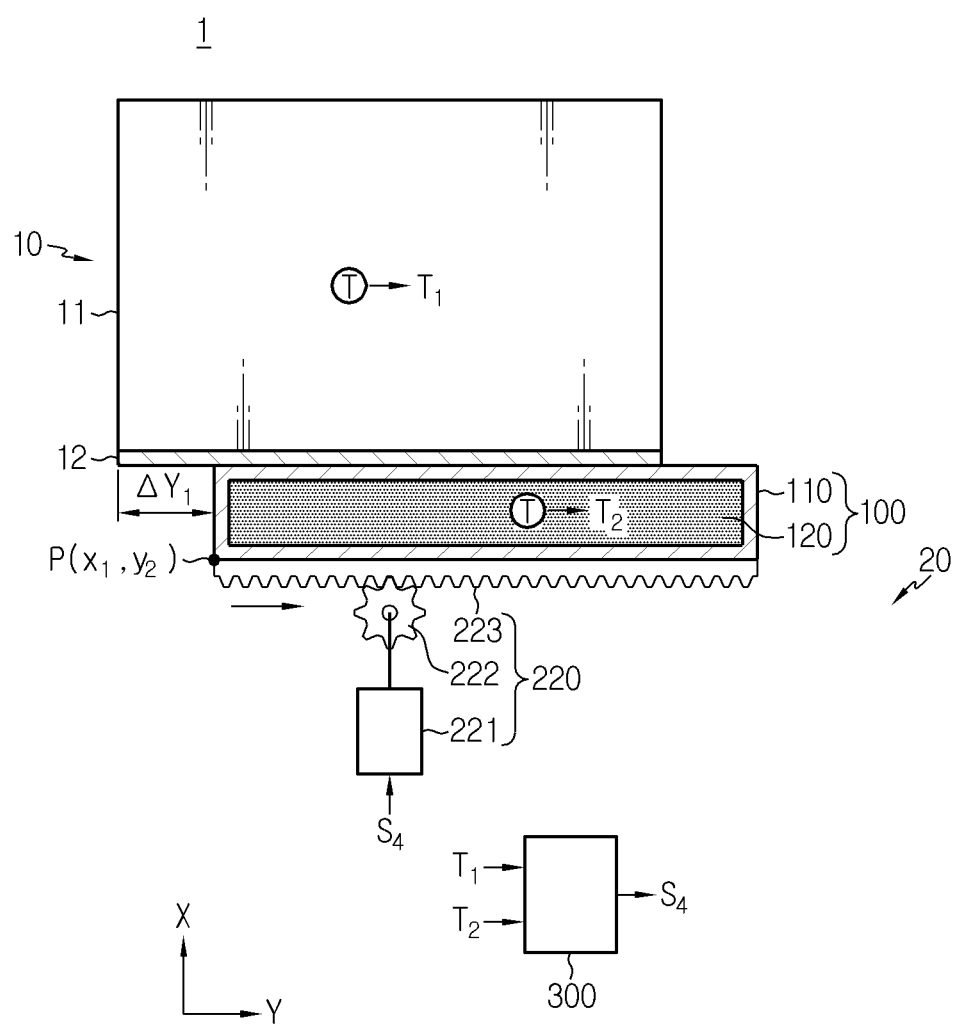

FIGS. 3 and 4 are diagrams for reference in describing the battery system 1 according to another embodiment of the present disclosure.

Referring to FIGS. 3 and 4, the temperature control apparatus 20 includes a cooling plate 100, a transport unit 220 and a control unit 300. Optionally, the temperature control apparatus 20 may further include a first temperature sensor 21 and a second temperature sensor 22. When comparing FIGS. 1 and 2, an only difference is that the transport unit 210 is replaced with the transport unit 220, so a redundant description of the common components is omitted herein.

The transport unit 220 is coupled to the cooling plate 100, and is configured to selectively move the cooling plate 100 in a direction or a reverse direction along the y-axis. The y-axis forms a predetermined angle (for example, a right angle) with the x-axis.

The transport unit 220 may include a second actuator 221, a third gear 222 and a fourth gear 223. The second actuator 221 may be, for example, a step motor, and is configured to rotate the third gear 222 in the clockwise or counterclockwise direction. The third gear 222 is disposed such that the third gear 222 is engaged with the fourth gear 223. The fourth gear 223 is configured to convert a rotational motion of the third gear 222 to a linear motion on the y-axis. For example, the third gear 222 may be a pinion gear, and the fourth gear 223 may be a rack gear. As shown, the fourth gear 223 is mechanically coupled to the cooling plate 100, and the contact area between the cooling plate 100 and the outer surface 12 may change within a predetermined second range according to an amount of rotation of the third gear 222. The transport unit 220 may only move the cooling plate 100 along the y-axis. Accordingly, the movement of the cooling plate 100 along the x-axis is restricted.

The control unit 300 is operably coupled to the transport unit 220. The control unit 300 may select any one of a third operation mode and a fourth operation mode based on at least one of the first temperature value and the second temperature value at a predetermined time interval or each time a preset condition is satisfied. The third operation mode is a mode for bringing the cooling plate 100 into contact with the outer surface 12 to the maximum extent, and the fourth operation mode is a mode for reducing the contact area between the cooling plate 100 and the outer surface 12 so that the contact area is smaller than the contact area of the third operation mode.

When the third operation mode is selected, the control unit 300 outputs a control signal $S_3$ to the transport unit 220 for commanding the transport unit 220 to move the cooling plate 100 to a third location along the y-axis. For example, the third location may be the same as the above-described first location. Of course, the third location may be preset differently from the first location. When the cooling plate 100 moves to the third location, the x-y coordinates of the predetermined point P of the cooling plate 100 may be ($x_1$, $y_1$). As shown in FIG. 3, when the cooling plate 100 is moved to the third location, the contact area between the cooling plate 100 and the outer surface 12 may be maximized. Accordingly, heat can be transferred from the battery 10 to the cooling plate 100 through the contact part between the cooling plate 100 and the outer surface 12.

When the fourth operation mode is selected, the control unit 300 outputs a control signal $S_4$ to the transport unit 220 for commanding the transport unit 220 to move the cooling plate 100 to a fourth location along the y-axis. When the cooling plate 100 is moved to the fourth location, the coordinates of the predetermined point P of the cooling plate 100 may be ($x_1$, $y_2$). As shown in FIG. 4, when the cooling plate 100 is moved to the fourth location, the contact area between the cooling plate 100 and the outer surface 12 reduces. Accordingly, heat transfer from the outer surface 12 to the cooling plate 100 in the fourth operation mode may be less than that of the third operation mode.

The control unit 300 may determine the fourth location at the same time as the fourth operation mode is selected or after the fourth operation mode is selected. In detail, the third location is a preset fixed location at which the cooling plate 100 comes into contact with the outer surface 12 to the maximum extent, while the fourth location is a location that may change depending on at least one of the first temperature value and the second temperature value. The control unit 300 may calculate a second transport distance $\Delta Y_1$ based on at least one of the first temperature value and the second temperature value. For example, when the first temperature value is greater than the second temperature value, the second transport distance $\Delta Y_1$ may be proportional to a difference between the first temperature value and the second temperature value or a difference between the first temperature value and a preset first threshold within a predetermined second range. In this instance, $\Delta Y_1$ is equal to $y_2-y_1$ or $y_1-y_2$.

The control unit 300 may determine, as the fourth location, a location that is apart from the third location by the second transport distance along the y-axis. That is, the control signal $S_4$ may be a signal for commanding to move the cooling plate 100 so that the cooling plate 100 is spaced apart from the outer surface 12 by the second transport distance along the y-axis from the third location.

Figure 5:
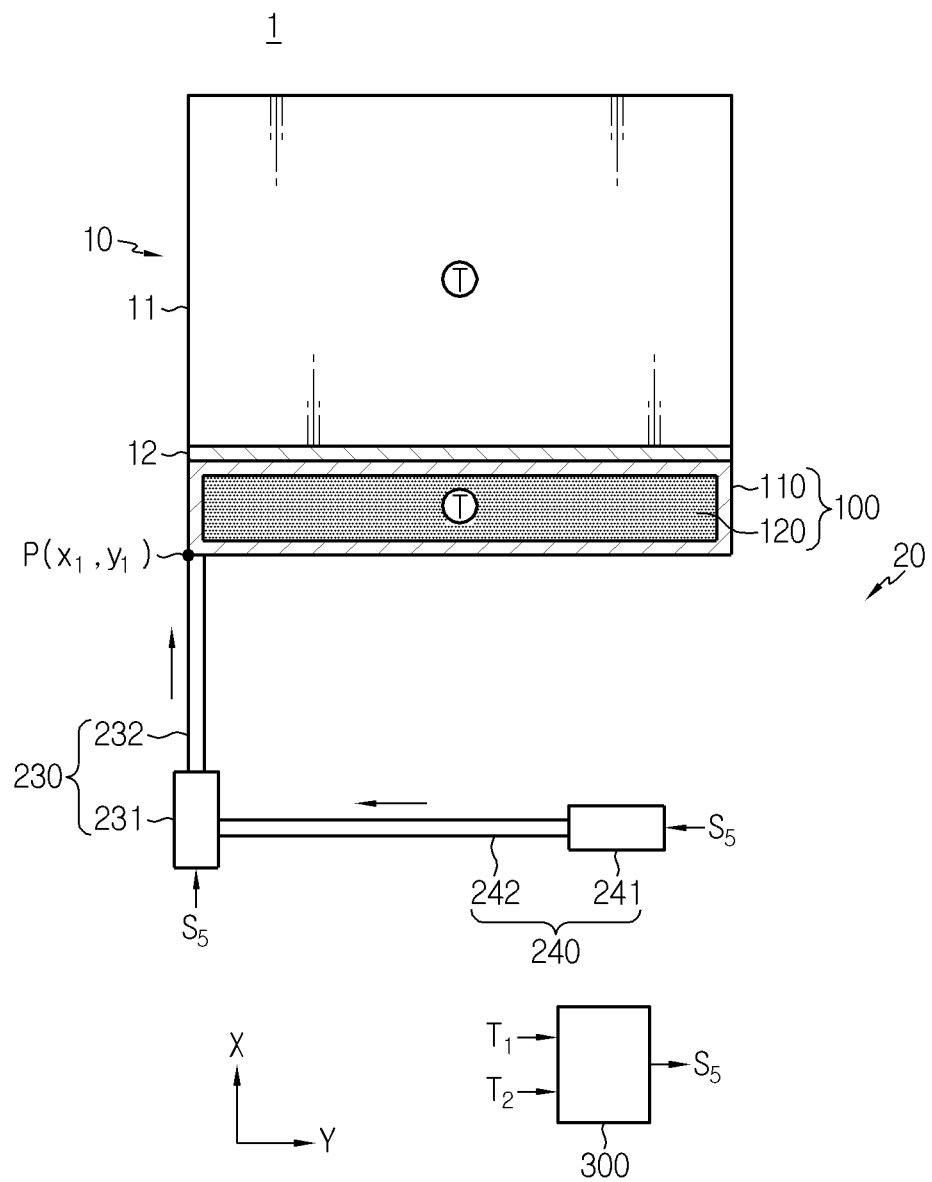
FIGS. 5 and 6 are diagrams for reference in describing a battery system according to still another embodiment of the present disclosure.
Figure 6:
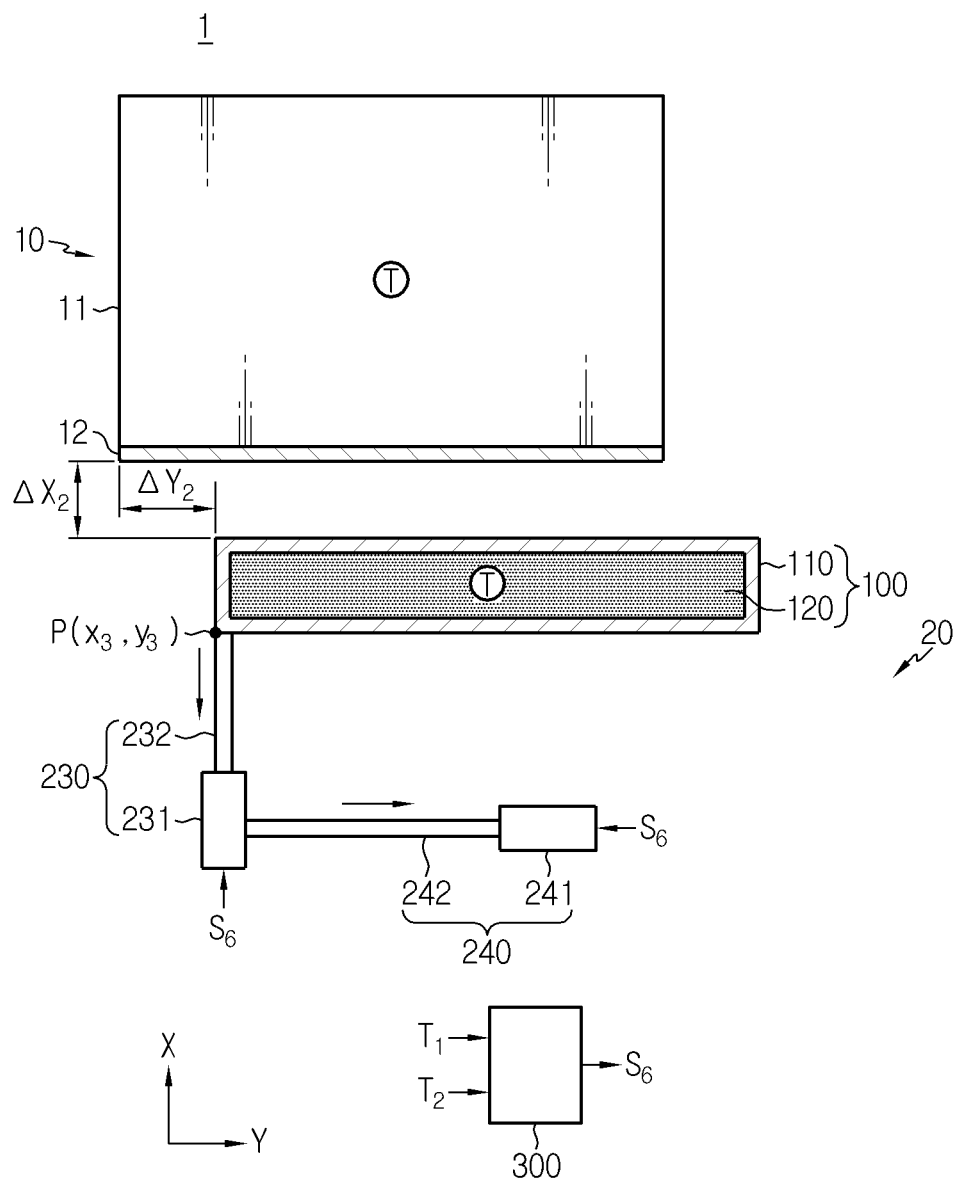

FIGS. 5 and 6 are diagrams for reference in describing the battery system 1 according to still another embodiment of the present disclosure.

Referring to FIGS. 5 and 6, the temperature control apparatus 20 includes a cooling plate 100, a transport unit 230, a fourth transport unit 240 and a control unit 300. Optionally, the temperature control apparatus 20 may further include at least one of a first temperature sensor 21 and a second temperature sensor 22. When comparing FIGS. 1 to 4, an only difference is that the transport unit 210 is replaced with the transport unit 230 and the transport unit 220 is replaced with the fourth transport unit 240, so a redundant description of the common components is omitted herein.

The transport unit 230 is mechanically coupled to the cooling plate 100, and is configured to selectively move the cooling plate 100 in a direction or a reverse direction along the x-axis. The transport unit 230 may include a third actuator 231 and a first piston 232. The third actuator 231 may be, for example, a hydraulic cylinder, and is configured to linearly reciprocate the first piston 232 within a predetermined first range along the x-axis. As shown, one side of the first piston 232 is coupled to the cooling plate 100, and the x-axis distance between the cooling plate 100 and the outer surface 12 may change within the predetermined first range. Alternatively, the transport unit 210 of FIGS. 1 and 2 may be replaced with the transport unit 230. Alternatively, the transport unit 230 may be replaced with the transport unit 210 of FIGS. 1 and 2.

The transport unit 240 is coupled to the cooling plate 100 through the transport unit 230, and is configured to selectively move the cooling plate 100 in a direction or a reverse direction along the y-axis. The fourth transport unit 240 may include a fourth actuator 241 and a second piston 242. The fourth actuator 241 may be, for example, a hydraulic cylinder, and is configured to linearly reciprocate the second piston within a predetermined second range along the y-axis. Alternatively, the transport unit 220 of FIGS. 3 and 4 may be replaced with the transport unit 240. Alternatively, the transport unit 240 may be replaced with the transport unit 220 of FIGS. 3 and 4.

The control unit 300 is operably coupled to the transport unit 230 and the fourth transport unit 240. The control unit 300 may select any one of a fifth operation mode and a sixth operation mode based on at least one of the first temperature value and the second temperature value at a predetermined time interval or each time a preset condition is satisfied. Similar to the third operation mode, the fifth operation mode is a mode for bringing the cooling plate 100 into contact with the outer surface 12 to the maximum extent. And similar to the second operation mode, the sixth operation mode is a mode for separating the cooling plate 100 from the outer surface 12 or reducing the contact area between the cooling plate 100 and the outer surface 12 so that the contact area is smaller than the contact area of the fifth operation mode.

When the fifth operation mode is selected, the control unit 300 outputs a control signal $S_5$ to the transport unit 230 and the fourth transport unit 240 for commanding the transport unit 230 and the fourth transport unit 240 to move the cooling plate 100 to a fifth location along the x-axis and y-axis respectively. For example, the fifth location may be the same as the above-described first location. When the cooling plate 100 is moved to the fifth location, the x-y coordinates of the predetermined point P of the cooling plate 100 may be $(x_1, y_1)$. As shown in FIG. 5, when the cooling plate 100 is moved to the fifth location, the contact area between the cooling plate 100 and the outer surface 12 is maximized.

When the sixth operation mode is selected, the control unit 300 outputs a control signal $S_6$ to the transport unit 230 and the transport unit 240 for commanding the transport unit 230 and the transport unit 240 to move the cooling plate 100 to a sixth location along the x-axis and y-axis respectively. As shown in FIG. 6, when the cooling plate 100 is moved to the sixth location, the x-y coordinates of the predetermined point P of the cooling plate 100 may be $(x_3, y_3)$.

The control unit 300 may determine the sixth location at the same time as the sixth operation mode is selected or after the sixth operation mode is selected. In detail, the fifth location is a preset fixed location at which the cooling plate 100 comes into contact with the outer surface 12 to the maximum extent, while the sixth location is a location that may change depending on at least one of the first temperature value and the second temperature value. The control unit 300 may calculate a third transport distance $\Delta X_2$ and a fourth transport distance $\Delta Y_2$ based on at least one of the first temperature value and the second temperature value. For example, when the first temperature value is greater than the second temperature value, the third transport distance $\Delta X_2$ may be proportional to a difference between the first temperature value and the second temperature value or a difference between the first temperature value and a preset first threshold within a predetermined first range. In another example, when the first temperature value is greater than the second temperature value, the fourth transport distance $\Delta Y_2$ may be proportional to a difference between the first temperature value and the second temperature value or a difference between the first temperature value and a preset first threshold within a predetermined second range.

In this instance, $\Delta X_2$ is equal to $x_3-x_1$ or $x_1-x_3$, and $\Delta Y_2$ is equal to $y_3-y_1$ or $y_1-y_3$. The control unit 300 may determine, as the sixth location, a location that is apart from the fifth location by the third transport distance along the x-axis and apart from the fifth location by the fourth transport distance along the y-axis.

As described above, the first location, the third location and the fifth location may be the same location, and may be referred to as 'reference location'.

Figure 7:
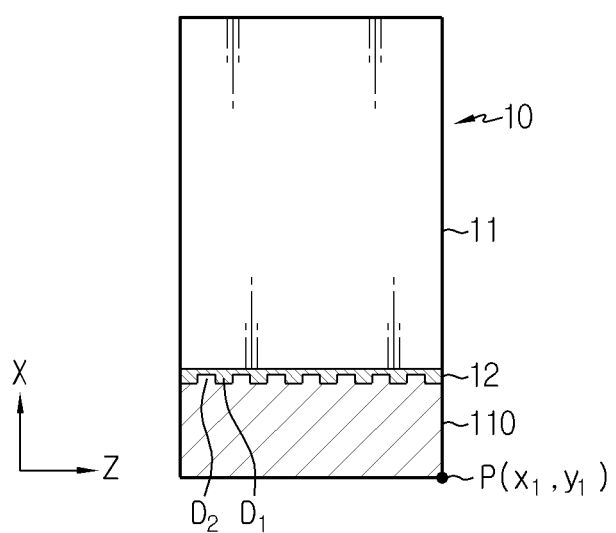
FIG. 7 is an exemplary diagram showing a battery and a cooling plate contacting each other when viewed from A of FIG. 1.

FIG. 7 is an exemplary diagram showing the battery 10 and the cooling plate 100 contacting each other when viewed from A of FIG. 1.

Referring to FIG. 7, the outer surface 12 of the battery 10 may include a plurality of first protrusions $D_1$. Each first protrusion $D_1$ protrudes from the outer surface 12 toward the cooling plate 100 in a predetermined shape and size. Each first protrusion $D_1$ may extent straight to a predetermined length along the y-axis.

Additionally, the cooling plate 100 disposed such that the cooling plate 100 can contact the outer surface 12 may include a plurality of second protrusions $D_2$. Each second protrusion $D_2$ protrudes from one surface facing the outer surface 12 of the cooling plate 100 toward the outer surface 12 in a predetermined shape and size. Each second protrusion $D_2$ may extent straight to a predetermined length along the y-axis.

The plurality of first protrusions $D_1$ and the plurality of second protrusions $D_2$ are for increasing the contact area between the outer surface 12 and the cooling plate 100.

When the cooling plate 100 is moved to the reference location, each second protrusion $D_2$ may be disposed between two adjacent first protrusions of the plurality of first protrusions $D_1$. Accordingly, the plurality of first protrusions $D_1$ and the plurality of second protrusions $D_2$ are in contact with each other.

Figure 8:
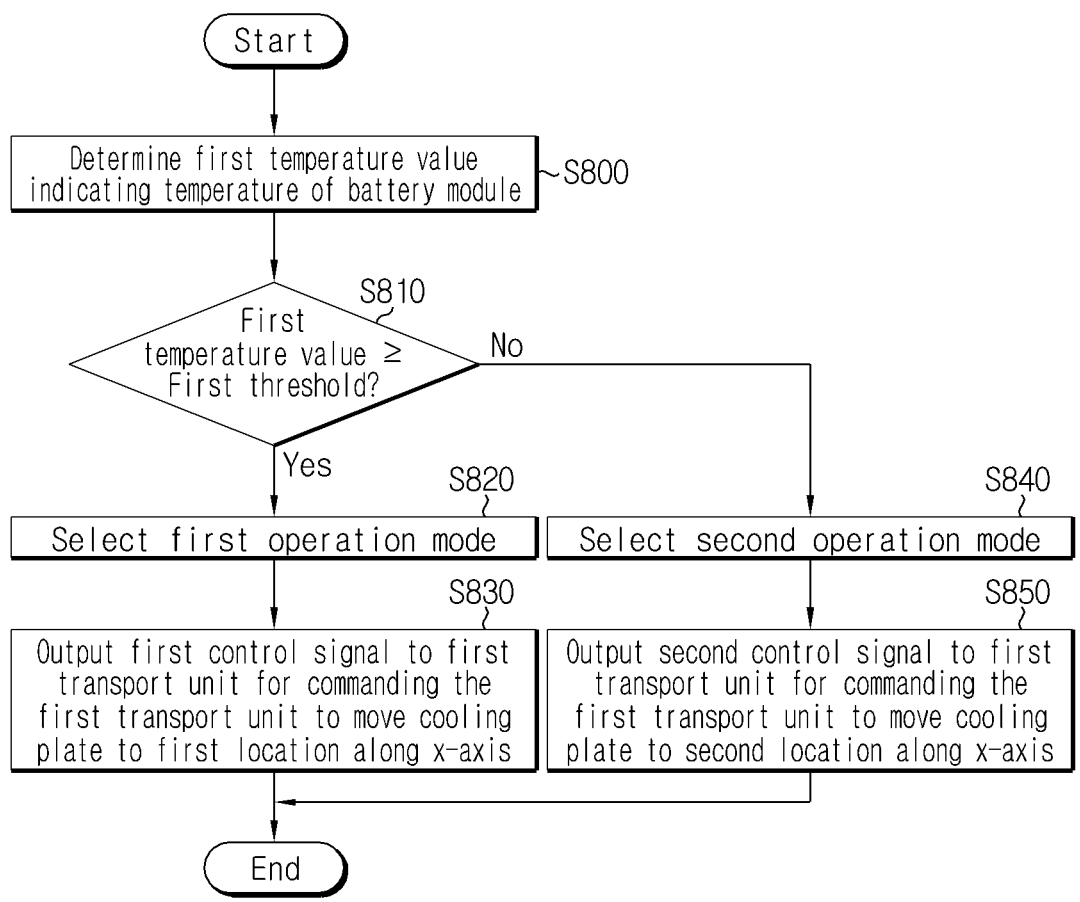
FIG. 8 is a flowchart showing a method related to FIGS. 1 and 2.

FIG. 8 is a flowchart showing a method related to FIGS. 1 and 2.

Referring to FIG. 8, in step S800, the control unit 300 determines the first temperature value indicating the temperature of the battery 10 based on the first temperature signal $T_1$ from the first temperature sensor 21.

In step S810, the control unit 300 determines whether the first temperature value is equal to or larger than the preset first threshold. When the result of the step S810 is "YES", step S820 is performed. When the result of the step S810 is "NO", step S840 is performed.

In step S820, the control unit 300 selects the first operation mode.

In step S830, the control unit 300 outputs the control signal $S_1$ to the transport unit 210 for commanding the transport unit 210 to move the cooling plate 100 to the first location along the x-axis. The first actuator 211 of the transport unit 210 operates in response to the control signal $S_1$. When the cooling plate 100 is moved to the first location, the cooling plate 100 comes into contact with the outer surface 12 by the preset maximum area.

In step S840, the control unit 300 selects the second operation mode. This is to reduce the contact area between the outer surface 12 and the cooling plate 100 or prevent the cooling plate 100 from coming into contact with the outer surface 12 when the temperature of the cooling plate 100 is not sufficiently lower than the temperature of the battery 10.

In step S850, the control unit 300 outputs the control signal $S_2$ to the transport unit 210 for commanding the transport unit 210 to move the cooling plate 100 to the second location along the x-axis. The first actuator 211 of the transport unit 210 operates in response to the control signal $S_2$. When the cooling plate 100 is moved to the second location, the cooling plate 100 is separated from the outer surface 12.

Figure 9:
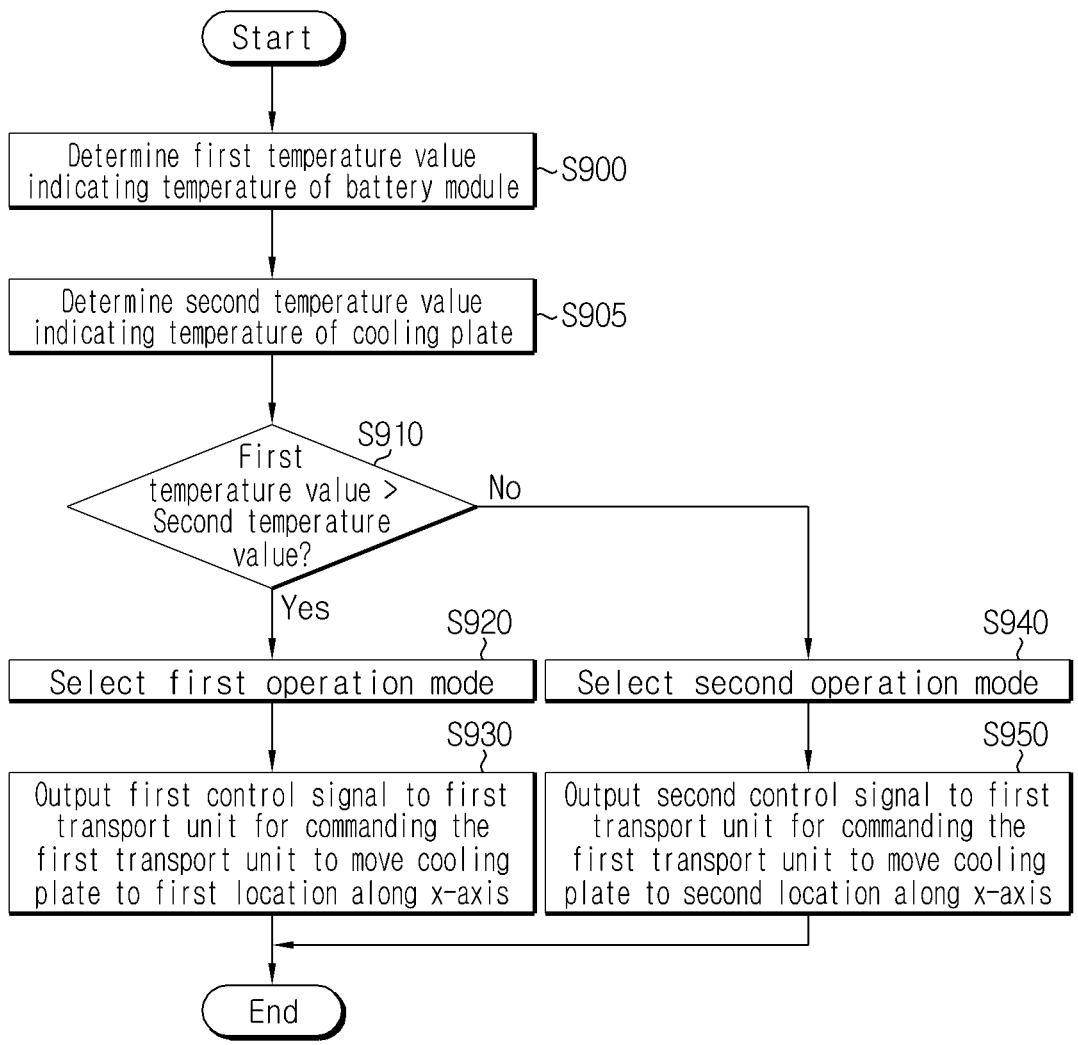
FIG. 9 is a flowchart showing another method related to FIGS. 1 and 2.

FIG. 9 is a flowchart showing another method related to FIGS. 1 and 2.

Referring to FIG. 9, in step S900, the control unit 300 determines the first temperature value indicating the temperature of the battery 10 based on the first temperature signal $T_1$ from the first temperature sensor 21.

In step S905, the control unit 300 determines the second temperature value indicating the temperature of the cooling plate 100 based on the second temperature signal $T_2$ from the second temperature sensor 22.

In step S910, the control unit 300 determines whether the first temperature value is larger than the second temperature value. When the result of the step S910 is "YES", step S920 is performed. When the result of the step S910 is "NO", step S940 is performed.

In step S920, the control unit 300 selects the first operation mode.

In step S930, the control unit 300 outputs the control signal $S_1$ to the transport unit 210 for commanding the transport unit 210 to move the cooling plate 100 to the first location along the x-axis. The first actuator 211 of the transport unit 210 operates in response to the control signal $S_1$. When the cooling plate 100 is moved to the first location, the cooling plate 100 comes into contact with the outer surface 12 by the preset maximum area.

In step S940, the control unit 300 selects the second operation mode.

In step S950, the control unit 300 outputs the control signal $S_2$ to the transport unit 210 for commanding the transport unit 210 to move the cooling plate 100 to the second location along the x-axis. The first actuator 211 of the transport unit 210 operates in response to the control signal $S_2$. When the cooling plate 100 is moved to the second location, the cooling plate 100 is separated from the outer surface 12.

Figure 10:
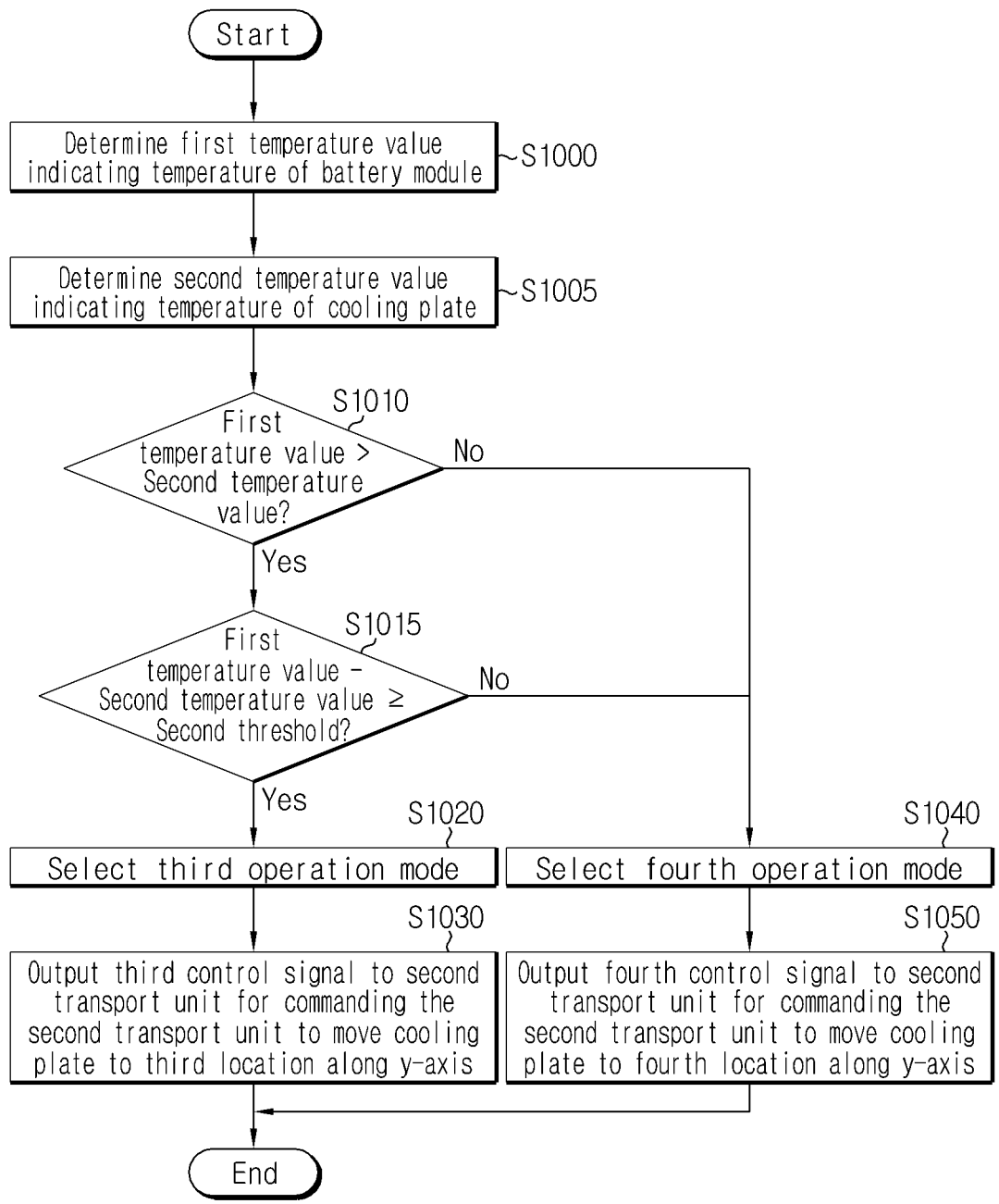
FIG. 10 is a flowchart showing a method related to FIGS. 3 and 4.

FIG. 10 is a flowchart showing a method related to FIGS. 3 and 4.

Referring to FIG. 10, in step S1000, the control unit 300 determines the first temperature value indicating the temperature of the battery 10 based on the first temperature signal $T_1$ from the first temperature sensor 21.

In step S1005, the control unit 300 determines the second temperature value indicating the temperature of the cooling plate 100 based on the second temperature signal $T_2$ from the second temperature sensor 22.

In step S1010, the control unit 300 determines whether the first temperature value is larger than the second temperature value. When the result of the step S1010 is "YES", step S1015 is performed. When the result of the step S1010 is "NO", step S1040 is performed.

In step S1015, the control unit 300 determines whether a difference between the first temperature value and the second temperature value is equal to or larger than a preset second threshold (e.g., 3° C.). When the result of the step S1015 is "YES", step S1020 is performed. When the result of the step S1015 is "NO", step S1040 is performed.

In step S1020, the control unit 300 selects the third operation mode.

In step S1030, the control unit 300 outputs the control signal $S_3$ to the transport unit 220 for commanding the transport unit 220 to move the cooling plate 100 to the third location along the y-axis. The second actuator 221 of the transport unit 220 operates in response to the control signal $S_3$. When the cooling plate 100 is moved to the third location, the cooling plate 100 comes into contact with the outer surface 12 by the preset maximum area.

In step S1040, the control unit 300 selects the fourth operation mode. This is to reduce the contact area between the outer surface 12 and the cooling plate 100 and increase the contact area of the outer surface 12 with air when the temperature of the cooling plate 100 is not sufficiently lower than the temperature of the battery 10.

In step S1050, the control unit 300 outputs the control signal $S_4$ to the transport unit 220 for commanding the transport unit 220 to move the cooling plate 100 to the fourth location along the y-axis. In this instance, the distance between the third location and the fourth location may correspond to the difference between the first temperature value and the second temperature value. The second actuator 221 of the transport unit 220 operates in response to the control signal $S_4$. When the cooling plate 100 is moved to the fourth location, the cooling plate 100 comes into contact with the outer surface 12 by an area smaller than the maximum area.

Figure 11:
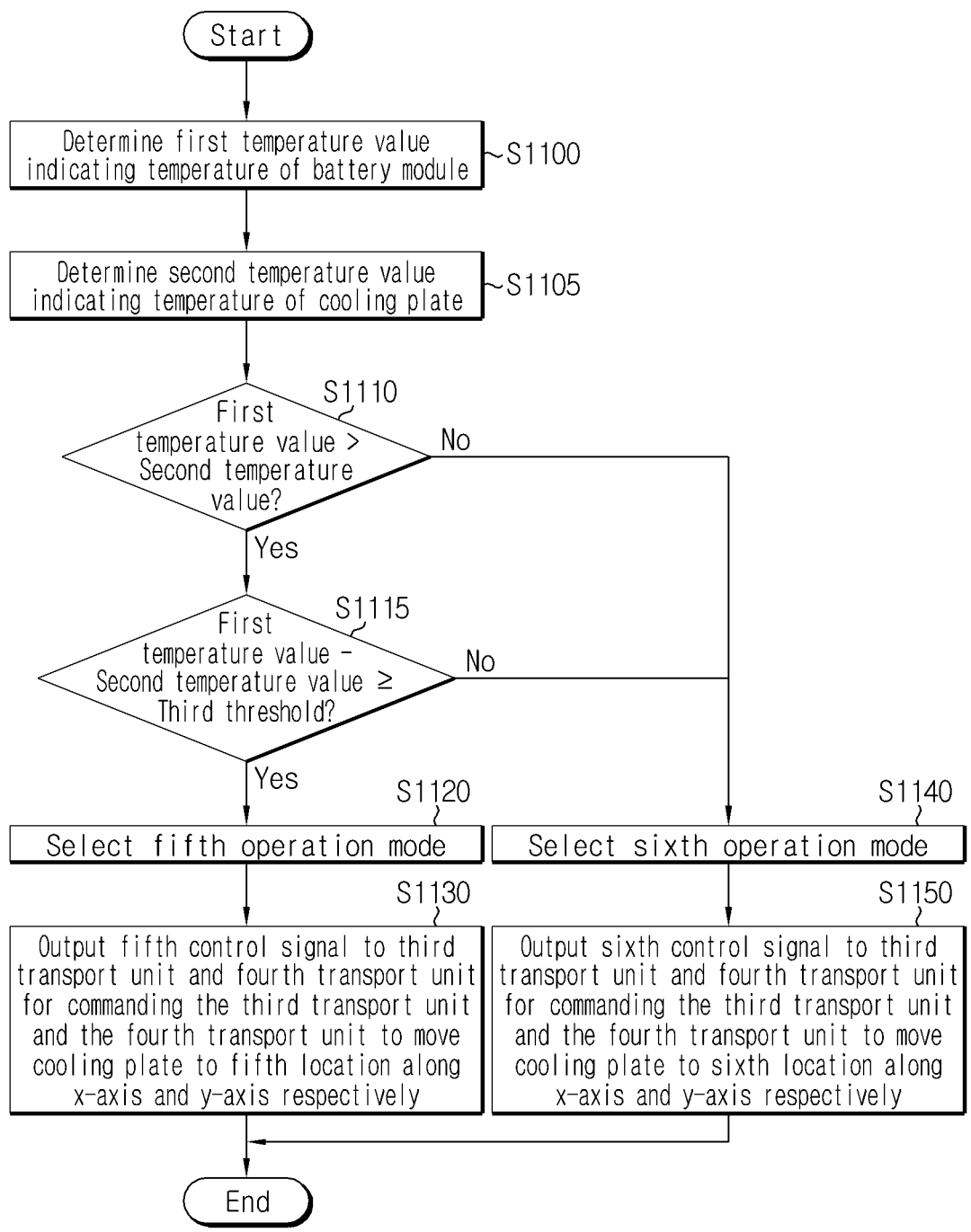
FIG. 11 is a flowchart showing a method related to FIGS. 5 and 6.

FIG. 11 is a flowchart showing a method related to FIGS. 5 and 6.

Referring to FIG. 11, in step S1100, the control unit 300 determines the first temperature value indicating the temperature of the battery 10 based on the first temperature signal $T_1$ from the first temperature sensor 21.

In step S1105, the control unit 300 determines the second temperature value indicating the temperature of the cooling plate 100 based on the second temperature signal $T_2$ from the second temperature sensor 22.

In step S1110, the control unit 300 determines whether the first temperature value is larger than the second temperature value. When the result of the step S1110 is "YES", step S1115 is performed. When the result of the step S1110 is "NO", step S1140 is performed.

In step S1115, the control unit 300 determines whether a difference between the first temperature value and the second temperature value is equal or larger than a preset third threshold. The third threshold may be equal to the second threshold. When the result of the step S1115 is "YES", step S1120 is performed. When the result of the step S1115 is "NO", step S1140 is performed.

In step S1120, the control unit 300 selects the fifth operation mode.

In step S1130, the control unit 300 outputs the control signal $S_5$ to the transport unit 230 and the transport unit 240 for commanding the transport unit 230 and the transport unit 240 to move the cooling plate 100 to the fifth location along the x-axis and y-axis respectively. Each of the third actuator 231 of the transport unit 230 and the fourth actuator 241 of the fourth transport unit 240 independently operates in response to the control signal $S_5$. When the cooling plate 100 is moved to the fifth location, the cooling plate 100 comes into contact with the outer surface 12 by the preset maximum area.

In step S1140, the control unit 300 selects the sixth operation mode. This is to reduce the contact area between the outer surface 12 and the cooling plate 100 and increase the contact area of the outer surface 12 with air when the temperature of the cooling plate 100 is not sufficiently lower than the temperature of the battery 10.

In step S1150, the control unit 300 outputs the control signal $S_6$ to the transport unit 230 and the transport unit 240 for commanding the transport unit 230 and the transport unit 240 to move the cooling plate 100 to the sixth location along the y-axis. Each of the third actuator 231 of the transport unit 230 and the fourth actuator 241 of the transport unit 240 independently operates in response to the control signal $S_6$. When the cooling plate 100 is moved to the sixth location, the cooling plate 100 comes into contact with the outer surface 12 by an area smaller than the maximum area, or is separated from the outer surface 12.

The embodiments of the present disclosure described hereinabove are not implemented only through the apparatus and method, and may be implemented through programs that realize the functions corresponding to the configurations of the embodiments of the present disclosure or recording media having the programs recorded thereon, and this implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and some or all the embodiments may be selectively combined together to make various modifications.

What is claimed is:

1. An apparatus for battery temperature control, comprising:
a cooling plate configured to come into contact with an outer surface of a battery;
a first transporter in contact with the cooling plate and configured to selectively move the cooling plate along a first axis to bring the cooling plate into contact with the outer surface of the battery or separate the cooling plate from the outer surface of the battery, wherein an entirety of the first transporter is physically separated from the battery; and
a controller operably coupled to the first transporter,
wherein the controller is configured to:
select any one of a first operation mode and a second operation mode based on a first temperature value indicating a temperature of the battery,
output a first control signal to the first transporter for commanding the first transporter to move the cooling plate to a first location in response to the first operation mode being selected, and
output a second control signal to the first transporter for commanding the first transporter to move the cooling plate to a second location in response to the second operation mode being selected,
wherein the cooling plate comes into contact with the outer surface by a preset area in response to the cooling plate being moved to the first location by the first transporter,
wherein the cooling plate comes into contact with the outer surface by an area smaller than the preset area or is separated from the outer surface in response to the cooling plate being moved to the second location by the first transporter,
wherein the first transporter includes an actuator and one of a gear or a piston, and
wherein the actuator of the first transporter moves the one of the gear or the piston to move the cooling plate.

2. The apparatus for battery temperature control according to claim 1, wherein the cooling plate includes a phase change material.

3. The apparatus for battery temperature control according to claim 1, wherein the outer surface of the battery includes a plurality of first protrusions protruding toward the cooling plate,
wherein the cooling plate includes a plurality of second protrusions protruding toward the outer surface, and
wherein the plurality of second protrusions is disposed between the plurality of first protrusions and comes into contact with the plurality of first protrusions in response to the cooling plate being moved to the first location.

4. The apparatus for battery temperature control according to claim 1, wherein the controller is configured to select the first operation mode in response to the first temperature value being equal to or larger than a first threshold.

5. The apparatus for battery temperature control according to claim 1, wherein the controller is configured to select any one of the first operation mode and the second operation mode further based on a second temperature value indicating a temperature of the cooling plate.

6. The apparatus for battery temperature control according to claim 5, wherein the controller is configured to select the first operation mode in response to the first temperature value being larger than the second temperature value and a difference between the first temperature value and the second temperature value being equal to or larger than a second threshold.

7. The apparatus for battery temperature control according to claim 6, wherein the controller is configured to select the second operation mode (i) in response to the first temperature value being equal to or less than the second temperature value, or (ii) in response to the first temperature value being larger than the second temperature value and a difference between the first temperature value and the second temperature value being less than the second threshold.

8. The apparatus for battery temperature control according to claim 7, wherein the controller is configured to calculate a transport distance based on the first temperature value and the second temperature value in response to the second operation mode being selected, and
wherein the transport distance indicates a distance between the first location and the second location.

9. The apparatus for battery temperature control according to claim 8, wherein the transport distance is proportional to a difference between the first temperature value and the second temperature value.

10. The apparatus for battery temperature control according to claim 5, further comprising:
a second transporter configured to selectively move the cooling plate along a second axis that is different from the first axis.

11. The A battery system comprising the apparatus for battery, temperature control according to claim 1.

12. An apparatus for battery temperature control, comprising:
a cooling plate configured to come into contact with an outer surface of a battery;
a first transporter configured to selectively move the cooling plate along a first axis to bring the cooling plate into contact with the outer surface of the battery or separate the cooling plate from the outer surface of the battery; and
a controller operably coupled to the first transporter,
wherein the controller is configured to:
select any one of a first operation mode and a second operation mode based on a first temperature value indicating a temperature of the battery,
output a first control signal to the first transporter for commanding the first transporter to move the cooling plate to a first location in response to the first operation mode being selected, and
output a second control signal to the first transporter for commanding the first transporter to move the cooling plate to a second location in response to the second operation mode being selected, wherein the cooling plate comes into contact with the outer surface by a preset area in response to the cooling; plate being moved to the first location by the first transporter, wherein the cooling plate comes into contact with the outer surface by an area smaller than the preset area or is separated from the outer surface in response to the cooling plate being moved to the second location by the first transporter, wherein the controller is configured to select any one of the first operation mode and the second operation mode further based on a second temperature value indicating a temperature of the cooling plate, wherein the controller is configured to select the first operation mode in response to the first temperature value being larger than the second temperature value and a difference between the first temperature value and the second temperature value being equal to or larger than a second threshold, wherein the controller is configured to select the second operation mode (i) in response to the first temperature value being equal to or less than the second temperature value, or (ii) in response to the first temperature value being larger than the second temperature value and a difference between the first temperature value and the second temperature value being less than the second threshold, wherein the controller is configured to calculate a transport distance based on the first temperature value and the second temperature value in response to the second operation mode being selected, and wherein the transport distance indicates a distance between the first location and the second location.

* * * * *